US012046122B1

(12) United States Patent
Baban

(10) Patent No.: US 12,046,122 B1
(45) Date of Patent: Jul. 23, 2024

(54) LOCKABLE TRACKING BRACELET FOR PEOPLE AND OBJECTS

(71) Applicant: Tawfeeq Baban, Roseville, CA (US)

(72) Inventor: Tawfeeq Baban, Roseville, CA (US)

( * ) Notice: Subject to any disclaimer, the term of this patent is extended or adjusted under 35 U.S.C. 154(b) by 0 days.

(21) Appl. No.: 18/093,736

(22) Filed: Jan. 5, 2023

(51) Int. Cl.
*G08B 25/01* (2006.01)
*G08B 25/10* (2006.01)
*G08B 25/14* (2006.01)

(52) U.S. Cl.
CPC ........... *G08B 25/016* (2013.01); *G08B 25/10* (2013.01); *G08B 25/14* (2013.01)

(58) Field of Classification Search
CPC ....... G08B 25/016; G08B 25/10; G08B 25/14
See application file for complete search history.

(56) References Cited

U.S. PATENT DOCUMENTS

2018/0293369 A1* 10/2018 Tian ..................... G08B 21/182
2021/0118276 A1* 4/2021 Matsuzawa ............. G06F 1/163
2022/0114873 A1* 4/2022 Williams ........... G08B 21/0269

* cited by examiner

*Primary Examiner* — Omeed Alizada
(74) *Attorney, Agent, or Firm* — HAYNES AND BOONE, LLP

(57) ABSTRACT

Disclosed is a tracking method comprising: detecting, by a tracking device, a trigging event; automatically sending, by the tracking device, a notification associated with the trigging event to a principal device to determine whether to send a controlling signal to the tracking device; receiving, by the tracking device, the controlling signal from the principal device; and broadcasting, by the tracking device, one or more alarm signals associated with the trigging event to one or more affiliate device.

19 Claims, 7 Drawing Sheets

LOCKABLE TRACKING BRACELET FOR PEOPLE AND OBJECTS

TECHNICAL FIELD

This disclosure is directed to wearable devices having locking mechanisms and broadcasting abilities. The described systems and methods may have applicability in surveillance, monitoring, and crime prevention.

BACKGROUND

Wearable devices such as watches have become smarter over the years. Traditional smartphone functions such as mobile communication, texting, mobile payments, health monitoring, and GPS tracking are now being developed and repurposed for watches and wearable fitness trackers. Although these devices are becoming more like smartphones, some specific functions tailored to safety and deterring crimes are not satisfactory in all regards. When a person is confronted with danger or perceives himself or herself to be in danger, he or she would usually need to call on their phone for help. However, taking out their phone to call or text in some cases may adversely alert the perpetrator, thereby putting the person in more danger. Therefore, there is a need for a wearable safety device with smart functions that allow vulnerable populations to anonymously alert and call for help when they are in danger.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
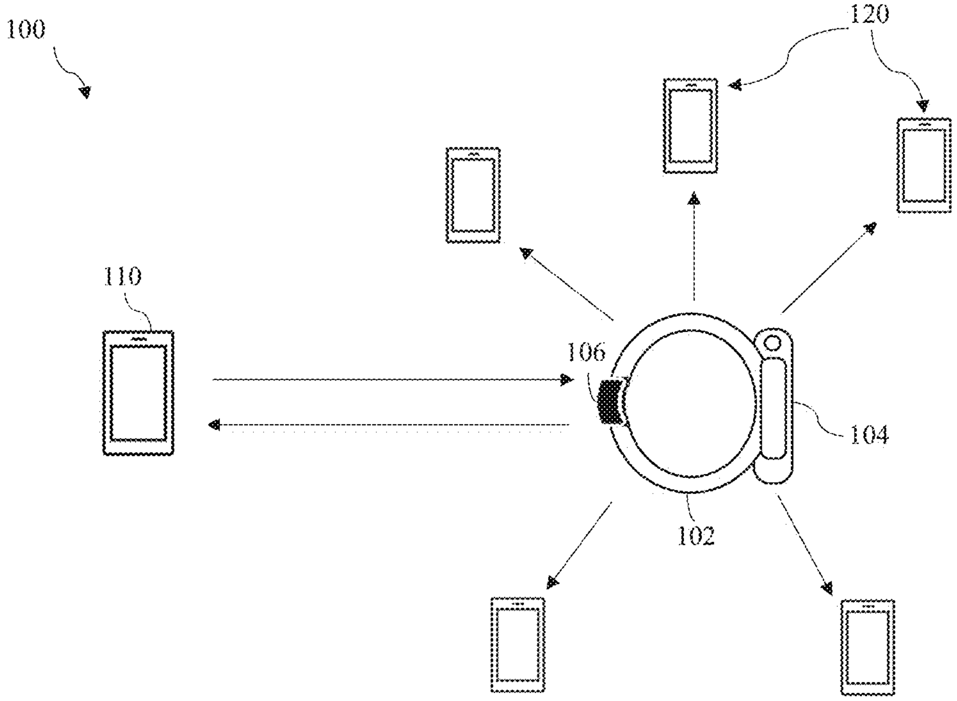
FIG. 1 illustrates an example tracking system that uses the locking mechanisms and broadcasting abilities described herein.

The following disclosure provides many different embodiments, or examples, for implementing different features of the provided subject matter. Specific examples of components and arrangements are described below to simplify the present disclosure. These are, of course, merely examples and are not intended to be limiting. In view of the present disclosure, modifications, additions, or omissions may be made to the systems, devices, and methods described herein without departing from the spirit and scope of the disclosure.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

This application provides a method and a wearable safety device with smart functions that allow vulnerable populations to anonymously alert and call for help when they are in danger.

According to one aspect, a tracking method is provided, and includes: detecting, by a tracking device, a trigging event; automatically sending, by the tracking device, a notification associated with the trigging event to a principal device to determine whether to send a controlling signal to the tracking device; receiving, by the tracking device, the controlling signal from the principal device; and broadcasting, by the tracking device, one or more alarm signals associated with the trigging event to one or more affiliate device.

In an embodiment, the tracking device is a wearable device. In an embodiment, the tracking device is a lockable tracking bracelet including a band structure. In an embodiment, the tracking device includes a locking feature to lock or unlock the tracking device. In an embodiment, the locking feature of the tracking device is controlled by the principal device.

In an embodiment, the tracking device includes an alarm feature to broadcast the one or more alarm signals. In an embodiment, the controlling signal received from the principal device is to trigger the alarm feature of the tracking device. In an embodiment, the locking feature is separate from the alarm feature.

In an embodiment, the band structure connects the locking feature to the alarm feature. In an embodiment, the locking feature connects two ends of the band structure. In an embodiment, when the locking feature is deactivated, the tracking device is unlocked, and the tracking device can be taken off. In an embodiment, when the locking feature is activated, the tracking device is locked, and the tracking device cannot be taken off until the locking feature is deactivated.

In an embodiment, the locking feature is activated and deactivated by the principal device. In an embodiment, the locking feature is activated by both the principal device and a wearer of the tracking device.

In an embodiment, the one or more alarm signals are broadcasted to the one or more affiliate device within a predetermined distance of the tracking device. In an embodiment, a tracking application associated with the tracking device is installed by the one or more affiliate device.

In an embodiment, the locking feature and the alarm feature are integrated together with the tracking device as a single unit. In an embodiment, the tracking device includes a display. In an embodiment, the tracking device includes a camera, wherein when an alarm is triggered, the camera is activated to take a video or a still image. In an embodiment, the tracking device includes an alarm button for sending an alert signal.

FIG. 1 illustrates an example tracking system 100 that uses the locking mechanisms and broadcasting abilities described herein. The tracking system 100 includes a wearable device 102, a principal device 110, and a plurality of affiliate devices 120. The wearable device 102 may be a watch, a bracelet, a wristband, or any other types of band structure that a person or a pet can wear. In some embodiments, the wearable device 102 may also be attached to a possession. The band structure of the wearable device 102 may be made of plastic, rubber, and other materials that make the band sturdy and hard to break off.

In some embodiments, the rubber material may include or be infused with graphene or nitrile for increased strength and durability. In other embodiments, the plastic material may include or be infused with copolyester, polycarbonate (PC), polybenzimidazole (PBI), polyvinyl chloride (PVS), polyethylene (PE), polypropylene (PP), acrylonitrile butadiene styrene (ABS), polyamide-imide (PAI), or high impact polystyrene (HIPS). In further embodiments, the band structure may include both plastic and rubber. The materials used for the band structure are intended to make the band structure unbreakable. In some embodiments, the wearable device 102 may also be waterproof. The wearable device 102 has a locking feature 106 and an alarm feature 104 that is attached to it. Alternatively, the locking feature 106 and the alarm feature 104 are integrated together with the wearable device 102 as a single unit. The locking feature 106 enables the locking or unlocking of the wearable device so that the wearable device cannot be forcibly removed by a perpetrator during a confrontation. The alarm feature 104 enables the wearable device 102 to broadcast signals to nearby devices. These signals are alarm signals that call for help when the subject wearing the wearable device 102 is in danger. In operation, the principal device 110 may control the functionalities of the wearable device 102 through wireless communication. The wearable device 102 may also communicate back to the principal device 110 about the status of the wearer. When an alarm is triggered by the alarm feature 104, broadcast signals are sent to affiliate devices 120, notifying the affiliate devices that the wearer is calling for help. In an embodiment, the alarm feature 104 enables the loud and preset talking alarm feature of the wearable device 102. This loud and preset talking alarm feature is useful for people with special needs (e.g., deaf, blind, mentally retarded, etc.) or in other cases like a child who fled the school. Further, the loud and preset talking alarm feature will be an alternative to triggering the alarm, and it will verbally notify the surrounding people that this person, pet, or a possession is in danger.

Figure 2:
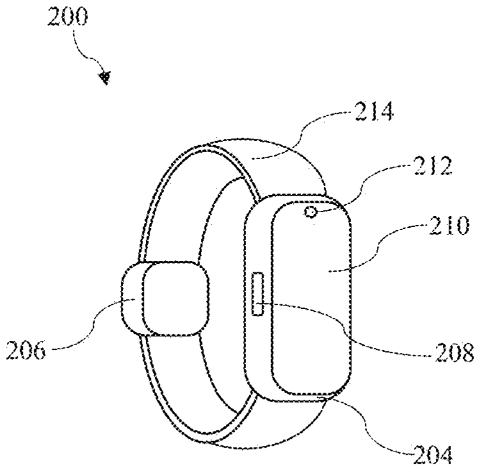
FIG. 2 illustrates a smartwatch embodiment that includes examples of the locking mechanisms and broadcasting abilities described herein.

FIG. 2 illustrates an embodiment of the present disclosure using a smartwatch 200. The smartwatch 200 is one example of the wearable device 102. The smartwatch 200 has a locking feature 206, an alarm feature 204, and a band structure 214. The locking feature 206 is separate from the alarm feature 204, and the band structure 214 connects the locking feature 206 to the alarm feature 204. The locking feature 206 connects the two ends of the band structure 214. The locking feature 206 may be activated or deactivated depending on whether the wearer of the smartwatch 200 is in danger. When the locking feature 206 is deactivated, the wearer may take off the smartwatch 200 as if it is a normal watch. When the locking feature 206 is activated, the wearer would not be able to take off the smartwatch 200 until the locking feature 206 is deactivated.

In some embodiments, the locking feature 206 may only be activated and deactivated by the principal device 110. In other embodiments, the locking feature may be activated by both the principal device 110 and the wearer of the smartwatch 200. In further embodiments, the locking feature may be activated automatically when the smartwatch 200 is put on a subject. For example, the locking feature 206 may receive instructions from the principal device via wireless communication, thereby locking the smartwatch onto the wearer. Alternatively, or additionally, the locking feature may have features that allow the wearer to physically lock the smartwatch onto himself, either manually or automatically once the smartwatch is put on. The locking feature 206 may be unlocked in similar fashion. The locking feature 206 may be a smart lock controlled by a mobile app and/or a mechanical lock with a special key in case the mobile app or the smart lock malfunctions. The smart lock may include a digital lock, a magnetic lock, an electric lock, or a fingerprint lock. The mechanical lock may include a digit combination lock or a key lock.

Referring still to the smartwatch 200 of FIG. 2, the alarm feature 204 may include a display 210, a camera 212, and an alarm button 208. The alarm feature 204 also includes a GPS for tracking and may further include a speaker or microphone (not shown). The display 210 provides an interface for sending and receiving notifications to other devices via an application on the smartwatch 200 and on the other devices. The alarm button 208 acts as a panic button and may trigger an alarm, thereby sending an alert signal to other devices notifying the other devices that the wearer is in danger. The camera 212 may be activated when the alarm is triggered to take a video or a still image of the perpetrator. The speaker or microphone of the alarm feature may be similarly activated to record audio from the perpetrator and to speak wirelessly to the perpetrator through the smartwatch. The alarm feature 204 may be a standalone feature or it may be integrated into other features of the smart watch 200.

Figure 3:
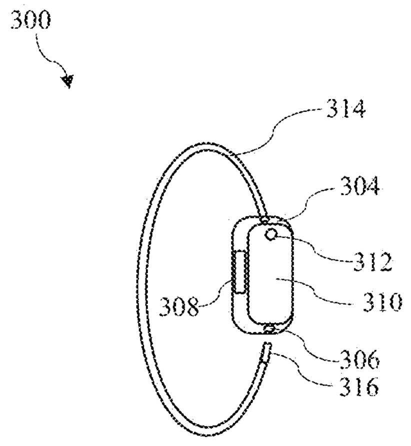
FIG. 3 illustrates a wristband/bracelet embodiment that include examples of the locking mechanisms and broadcasting abilities described herein.

FIG. 3 illustrates an embodiment of the present disclosure using a wristband/bracelet 300. The wristband/bracelet 300 is one example of the wearable device 102. The wristband/bracelet 300 has a locking feature 306, an alarm feature 304, and a band structure 314. In this embodiment, the locking feature 306 and the alarm feature 304 are not separated by the band structure 314, but they are integrated together on a single side. The locking feature 306 has a receptacle for a locking end 316 of the wristband/bracelet 300. Once the locking end 316 is plugged into the locking feature 306, the locking feature 306 may be activated or deactivated depending on whether the wearer of the wristband/bracelet 300 is in danger. When the locking feature 306 is deactivated, the wearer may take off the wristband/bracelet 300 by unplugging the locking end 316 by any normal means. When the locking feature 306 is activated, the wearer would not be able to take off the wristband/bracelet 300 until the locking feature 306 is deactivated. Similar to the locking feature 206, the locking feature 306 may be activated and deactivated by only the principal device 110 or by both the principal device 110 and the wearer of the wristband/bracelet 300. Similar to the locking feature 206, the locking feature 306 may be a smart lock controlled by a mobile app and/or a mechanical lock with a special key in case the mobile app or the smart lock malfunctions. For example, the locking mechanism may use a magnetic lock found in retail security tags, which may also be remotely controlled by a mobile app.

Referring still to the wristband/bracelet 300 of FIG. 3, the alarm feature 304 may include a display 310, a camera 312, and an alarm button 308. The alarm feature 304 also includes a GPS for tracking and may further include a speaker or microphone (not shown). These features function similarly to the alarm feature 204 in FIG. 2 and the description thereof is omitted for the sake of brevity. In the same way, the alarm feature 304 may be a standalone feature or it may be integrated into other features of the wristband/bracelet 300.

Figure 4:
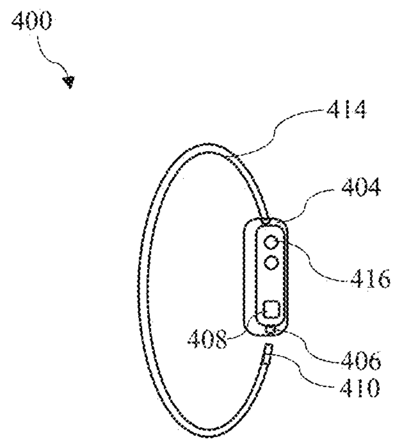
FIG. 4 illustrates yet another example of a wristband/bracelet embodiment that includes examples of the locking mechanisms and broadcasting abilities described herein.

FIG. 4 illustrates another embodiment of the present disclosure using a wristband/bracelet 400. The wristband/bracelet 400 is similar to the wristband/bracelet 300 in terms of the locking mechanisms and how the alarm feature operates. The similar features will not be recited again for the sake of brevity. One difference is that in the wristband/bracelet 400, the alarm feature 404 is simplified to not include a display, a camera, a microphone, or a speaker. The alarm feature 404 may only include an alarm button 408. In some embodiments, the alarm feature 404 may also include status indicators 416 indicating if an alarm is triggered and if the wristband/bracelet 400 is locked.

Figure 5:
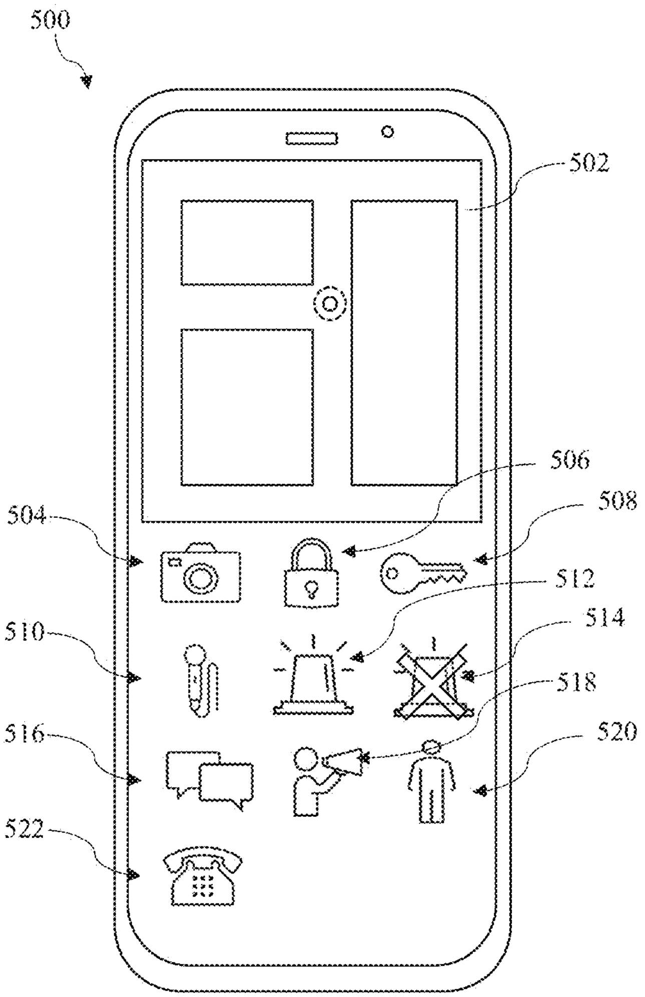
FIG. 5 illustrates an example graphical user interface on a computer device in communication with the smartwatch or wristband/bracelet of FIGS. 2-4.

FIG. 5 illustrates an example graphical user interface (GUI) on a computer device 500. The computer device 500 is in communication with the wearable device 102. The wearable device 102 may correspond to the smartwatch and wristbands/bracelets exemplified in FIGS. 2-4. The computer device 500 may correspond to the principal device 110 or affiliate devices 120 as exemplified in FIG. 1. The computer device 500 may be a smartphone, a tablet, a personal computer, or any other types of smart device capable of running an application with the features described below. The computer device 500 may run an application that permits issuing commands and receiving notifications to and from the wearable device 102.

When running the application, the computer device 500 may display the position of the wearable device 102 through GPS or other geolocation technology. The position may be displayed through a display screen 502, showing in real time where the wearable device 102 is located relative to a map. Because of the locking mechanism described above, the location of the wearable device 102 is likely the same as the location of the wearer. This is because a perpetrator confronting the wearer of the device 102 would have a hard time removing the device when it is locked.

The application through the GUI on a computer device 500 may allow other features, which are exemplified through a camera icon 504, a lock icon 506, an unlock icon 508, a recording icon 510, an alarm icon 512, a disarm icon 514, a messaging icon 516, a speaker icon 518, a contacting icon 520, and a phone icon 522.

Interacting with the camera icon 504 may trigger the camera on the wearable device 102 to start or stop recording live footage or snapping a still image. When the camera is triggered, the display 502 may show a live video or a still image of the wearable device's surrounding, informing the user of the application if the wearer of the device is in danger.

Interacting with the lock icon 506 may trigger the locking features exemplified in FIGS. 1-4. When triggered, wireless communication may be sent to the wearable device, where the wearable device will then lock itself without the wearer physically locking the wearable device. In the same way, interacting with the unlock icon 508 may unlock the wearable device through wireless communication.

Interacting with the recording icon 510 may trigger the microphone on the wearable device 102 to start or stop recording audio. When the microphone is triggered, the computer device 500 may play a live audio of the wearable device's surrounding, informing the user of the application if the wearer of the device is in danger.

Interacting with the alarm icon 512 may trigger the alarm features exemplified in FIGS. 1-4. When triggered, wireless communication will be sent to the wearable device, where the wearable device will begin sending or broadcasting signals to nearby devices, such as the affiliate devices 120 in FIG. 1. Since each computer device 500 may be a principal device 110 or an affiliate device 120, the application when run on an affiliate device 120 will allow receipt of the broadcasting signals. As will be explained in more detail below, the broadcasting signals will allow one or more affiliate devices to receive alert based on the location of the affiliate devices. In the same way, interacting with the disarm icon 514 may deactivate the alarm and stop the wearable device from sending any more broadcasting signals. In some embodiments, the wearable device will first send a notification that there is no more danger before it stops sending any more broadcasting signals.

Interacting with the messaging icon 516 may allow sending messages to the wearable device 200. The messages may display, for example, on display 210 or display 310 in FIGS. 2-3. Interacting with the speaker icon 518 may trigger the speaker on the wearable device 102. When triggered, a user may speak wirelessly from the computer device 500 and out of the speaker of the wearable device 102. For example, the user may remotely tell the perpetrator to stop what they are doing. Interacting with the contacting icon 520 may allow contacting the person who triggered the alarm. For example, the user may contact the person who triggered the alarm via text message, voice message or a call. Interacting with the phone icon 522 may trigger additional phone functions not explicitly stated herein.

The icons shown in FIG. 5 are used to explain the features and functionalities employed. They are not intended to be limiting. Some functions may be deleted for simplicity, and other functions additionally may be added. For example, additional functions may include a voice recognition feature to trigger the alarm or a call/messaging enablement feature to allow the user to communicate to nearby devices such as the affiliate devices 120 in FIG. 1. Depending on the use case, certain features may be turned on or off as needed in the discretion of the application user. Additionally, certain features will be locked until a condition is met. For example, an alarm may be triggered only when the locking feature is triggered. Or for example, once an alarm is triggered and/or the locking mechanism is triggered, only certain authorized people may turn off the alarm and/or unlock the wearable device 102. This is to prevent unauthorized people, such as a perpetrator, to turn off the alarm or unlock the wearable device without permission.

Figure 6:
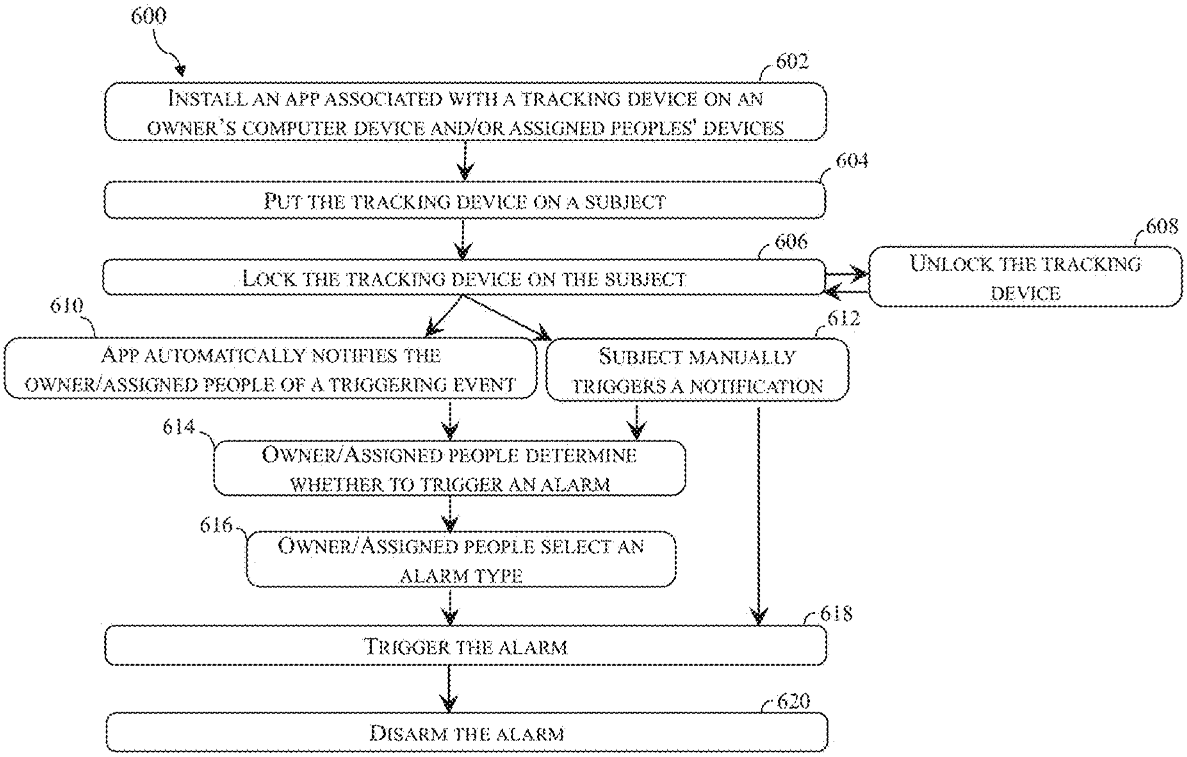
FIG. 6 illustrates a flowchart of a method of locking and broadcasting an alarm using the smartwatch or wristband/bracelet of FIGS. 2-4.

FIG. 6 is a flowchart illustrating a method 600 of the present disclosure using the tracking system 100 in view of the smartwatch or wristband/bracelet of FIGS. 2-4. Method 600 starts with step 602: installing an app associated with a tracking device on an owner's computer device and/or assigned peoples' devices. The computer device may correspond to a computer device 500. The tracking device may correspond to a wearable device 102, and the owner's and assigned peoples' devices may correspond to principal devices 110. The app may run on the owner's and/or assigned peoples' computers. In step 604, the tracking device is put on a subject. The subject may include the owner, children, elderly people, pets, and even possessions, as long as the tracking device can be worn by the subject. In step 606, the tracking device is locked on the subject by the locking features described above. The tracking device may be locked by the app and/or by the subject wearing the tracking device. In step 608, the tracking device may be unlocked. In some embodiments, only the owner using the app may unlock the tracking device. In other embodiments, only the assigned people may unlock the tracking device. For example, in cases where the owner is the subject wearing the tracking device, the app may be programed so that only assigned people by the owner have the authority to unlock the tracking device. In further embodiments, both the owner and the assigned people may unlock the tracking device. Note that after the tracking device is unlocked, it may be locked again by the locking features described above.

Referring still to FIG. 6, once the tracking device is locked, notification is sent in one of two ways. At step 610, the app automatically notifies the owner and/or assigned people of a triggering event. At step 612, the subject manually triggers a notification to the owner and/or assigned people of a triggering event. A triggering event is any event that may invite danger, such as being lost, being followed, or being in trouble of any kind. In step 614, the owner/assigned people determine whether to trigger an alarm. The decision on whether to trigger an alarm may be based on determining if there is any real danger by monitoring the tracking device. In step 616, the owner/assigned people will select an alarm type once they decide to trigger an alarm. As will be described in more detail below, the alarm type may be either broadcast, multicast, or unicast based on the status of surrounding devices. In step 618, the owner/assigned people trigger the alarm. Alternatively, the subject may automatically trigger the alarm after triggering a notification in step 612. For example, the subject may press an alarm button on the tracking device, which notifies the owner/assigned people of a triggering event, then at the same time or shortly after also trigger the alarm. In this case, the alarm type will be preset. In step 620, the alarm is disarmed once the danger subsides and when the triggering event issue is resolved. In some embodiments, only the owner using the app may disarm the alarm. In other embodiments, only the assigned people may disarm the alarm. For example, in cases where the owner is the subject wearing the tracking device, the app may be programed so that only assigned people by the owner have the authority to disarm the tracking device. In further embodiments, both the owner and the assigned people may disarm the tracking device.

Figure 7:
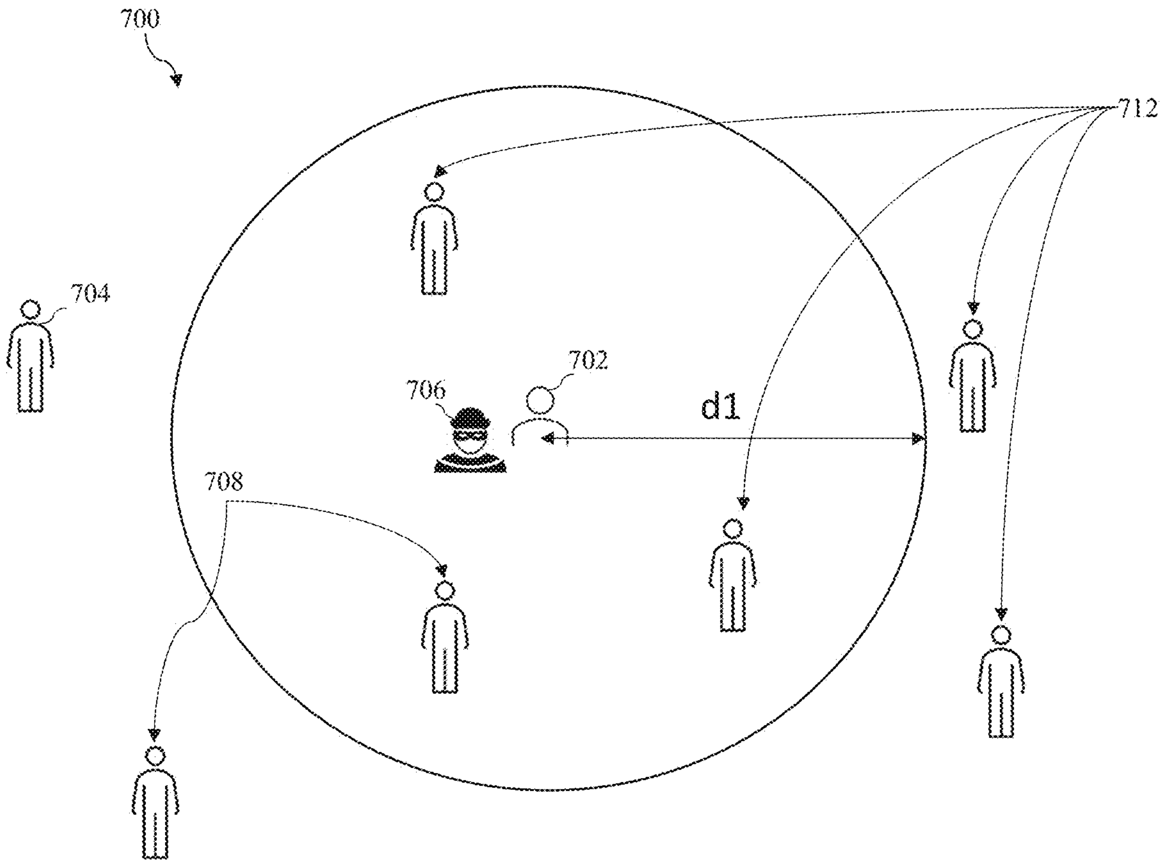
FIG. 7 illustrates different examples of broadcasting an alarm based on an alarm type using the smartwatch or wristband/bracelet of FIGS. 2-4.

FIG. 7 illustrates a scenario 700 showing different examples of broadcasting an alarm based on an alarm type. In the scenario 700, a subject 702 is wearing a tracking device such as a wearable device 102 exemplified in the smartwatch or wristband/bracelet of FIGS. 2-4. The subject 702 may be any person such as a child or an elderly person. Alternatively, the subject 702 may even be a pet or a possession. The tracking device on the subject 702 includes geofencing technology able to detect devices near it within a distance d1. In the scenario 700, an owner 704 of the tracking device is positioned outside the distance d1 from the subject. The owner 704 may be the parent of a child or a guardian of an elderly person wearing the tracking device. A perpetrator 706 is near the subject 702, which illustrates a triggering event that may trigger an alarm. Note that in other scenarios, a perpetrator 706 is not needed to trigger an alarm. A triggering event may just be the subject being lost or a subject needing help in some way. The scenario 700 also shows assigned people 708 and general subscribers 712. Assigned people 708 are those that are given more authority by the owner 704 in monitoring the subject 702. General subscribers 712 are those that subscribe to the common application used by the tracking device. In an embodiment, this common application can be downloaded without the need of buying the device, to help increasing the number of people who receive the alarm notification, and to highly improve and enhance the above function and results. The owner 704, the assigned people 708, and the general subscribers all have a computer device on them such as the computer device 500 described above. The owner 704 and assigned people 708 may each have a principal device 110, and the general subscribers may each have an affiliate device 120. Each of these devices have the app associated with the tracking device installed.

Referring still to FIG. 7, once an alarm is triggered, a signal is sent from the tracking device to call for help depending on an alarm type. The alarm type may be broadcast, multicast, or unicast. In all alarm types, the alarm sent may be in the form of a loud notification or a silent notification. For example, in certain situations a silent notification may be preferable to keep a perpetrator from knowing help is on the way. Once an alarm is triggered, a notification may be sent one time and the recipients will be able to see and track through the app the live location of the tracking device as long as the alarm remains on. Additionally, reminder notifications may be sent periodically as long as the alarm remains on.

For the broadcast alarm type, the alarm signal will broadcast to every general subscriber 712 that is within a distance d1 from the subject 702. Although not explicitly labeled, the owner 704 and the assigned people 708 may also be considered general subscribers 712. Therefore, if they are within the distance d1, they will also get notified by the alarm signal. In some embodiments, the owner and/or the assigned people always get notified regardless if they are within the distance d1. The distance d1 may be preset to a number such as 20 m, 50 m, 100 m, 1000 m, or more. The distance d1 may also be adjusted in real time depending on need. The alarm signal will alert general subscribers 712 that are within range and notify them through the app the location and status of the subject 702. The status information may include photo, age, description, or other identifying characteristics.

For the multicast alarm type, the alarm signal will be sent to the assigned people 708. Note that in some embodiments, the owner 704 may also be one of the assigned people 708. In one case, the alarm signal may only be sent to the assigned people 708 that are within the distance d1. In another case, the assigned people 708 may receive the alarm signal regardless of if they are within the distance d1. For example, there may be a preset where all assigned people 708 would always get notified when the subject 702 triggers an alarm. In the multicast alarm type, the general subscribers would not be notified. The alarm signal will only alert the assigned people 708 and notify them through the app the location and status of the subject 702. The status information may include photo, age, description, or other identifying characteristics.

For the unicast alarm type, the alarm signal will be sent only to the owner 704. In one case, the alarm signal may only be sent to the owner 708 if he or she is within the distance d1. In another case, the owner 704 may receive the alarm signal regardless of if he or she is within the distance d1. For example, there may be a preset where the owner 704 would always get notified when the subject 702 triggers an alarm. In either case, the assigned people and the general subscribers would not be notified. The alarm signal will alert the owner 704 and notify them through the app the location and status of the subject 702. The status information may include photo, age, description, or other identifying characteristics.

When an alarm remains on, the distance d1 that surrounds the subject 702 is constantly updated to reflect the current location of the subject 702. Once the alarm is disarmed and turned off, the live location tracking will be turned off and all the previously notified people may receive a new notification showing that the issue is resolved.

It should be appreciated that the example methods and scenarios described herein may be modified as appropriate based on need and other constraints. The tracking systems, devices, and methods described may be used for various applications, as will be appreciated by those experienced in the art.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A tracking method, comprising:

detecting, by a tracking device, a trigging event;

automatically sending, by the tracking device, a notification associated with the trigging event to a principal device to determine whether to send a controlling signal to the tracking device;

receiving, by the tracking device, the controlling signal from the principal device to trigger an alarm; and upon receiving the controlling signal, triggering the alarm by the tracking device, wherein the triggering of the alarm includes transmitting, by the tracking device, one or more alarm signals associated with the trigging event to the principal device and to one or more affiliate devices within a predetermined distance of the tracking device, wherein the principal device runs a first tracking application associated with the tracking device and the one or more affiliate devices runs a second tracking application associated with the tracking device;

wherein the first tracking application, but not the second tracking application, is configured to trigger or to disarm the alarm.

2. The method of claim 1, wherein the tracking device is a lockable tracking bracelet including a band structure, wherein the band structure includes a rubber material infused with graphene or nitrile and a plastic material infused with copolyester.

3. The method of claim 2, wherein the tracking device includes a locking feature to lock or unlock the tracking device, and the locking feature is activated and deactivated by the principal device.

4. The method of claim 3, wherein the alarm is triggered only when the locking feature of the tracking device is activated.

5. The method of claim 3, wherein the tracking device includes an alarm feature to transmit the one or more alarm signals.

6. The method of claim 5, wherein the band structure connects the locking feature to the alarm feature.

7. The method of claim 3, wherein the locking feature connects two ends of the band structure.

8. The method of claim 3, wherein when the locking feature is deactivated, the tracking device is unlocked and the tracking device can be taken off.

9. The method of claim 3, wherein when the locking feature is activated, the tracking device is locked and the tracking device cannot be taken off until the locking feature is deactivated.

10. The method of claim 3, wherein the locking feature is activated by both the principal device and a wearer of the tracking device.

11. The method of claim 5, wherein the locking feature and the alarm feature are integrated together with the tracking device as a single unit.

12. The method of claim 1, wherein the tracking device includes a display.

13. The method of claim 1, wherein the tracking device includes a camera, wherein when the alarm is triggered, the camera is activated to take a video or a still image.

14. The method of claim 1, wherein the tracking device includes an alarm button for sending an alert signal.

15. The method of claim 1, wherein the one or more alarm signals are silent notifications to the principal device and to the one or more affiliate devices.

16. The method of claim 15, wherein the one or more silent notifications include live location information of the tracking device as long as the alarm remains triggered.

17. The method of claim 1, further comprising:

disarming the alarm by the principal device once the trigging event is resolved, wherein once the alarm is disarmed, each of the affiliate devices receives a notification indicating the trigging event is resolved.

18. The method of claim 1, wherein the principal device is configured with greater authority to monitor the tracking device than the affiliate devices.

19. The method of claim 18, wherein the principal device is configured to transmit and receive communication signals to and from the tracking device while the affiliate devices are configured to only receive communication signals from the tracking device.

* * * * *